United States Patent Office 3,792,102
Patented Feb. 12, 1974

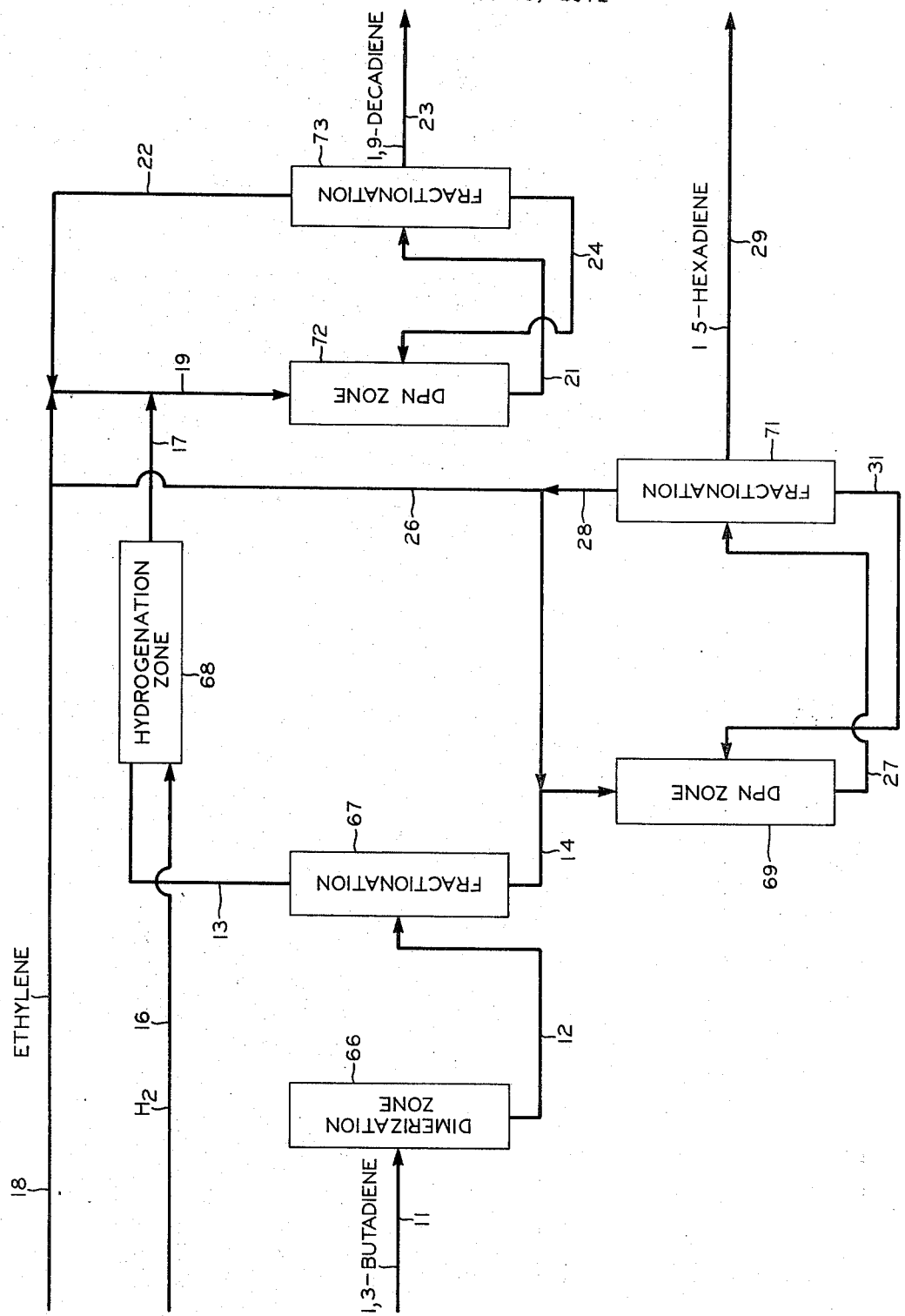

3,792,102
PREPARATION OF 1,9-DECADIENE FROM
ETHYLENE AND CYCLOOCTENE
Van C. Vives and Robert E. Reusser, Bartlesville, Okla.,
assignors to Phillips Petroleum Company
Filed Dec. 30, 1971, Ser. No. 213,928
Int. Cl. C07c 3/62, 11/12
U.S. Cl. 260—680 R                          3 Claims

ABSTRACT OF THE DISCLOSURE

The olefin disproportionation reaction of mixtures of acyclic and cyclic olefin hydrocarbons to produce dienes is improved by using a consecutive bed catalyst arrangement wherein the first bed is a bed of magnesium oxide and the second bed is a solid olefin disproportionation catalyst. Subsequent to separation of the reaction effluent, the heavier olefin hydrocarbons produced in the consecutive bed reaction zone are returned to the reaction zone at a point intermediate to the two beds to provide conversion of the heavier materials to additional diene product. In addition, a combination process is provided wherein 1,9-decadiene and 1,5-hexadiene are produced from butadiene, ethylene, and hydrogen using dimerization, hydrogenation, and olefin disproportionation steps.

BACKGROUND OF THE INVENTION

Field of the invention

This invention relates to olefin disproportionation. In a further aspect, this invention relates to the reaction of acyclic olefins and cyclic olefins by means of the olefin disproportionation reaction to produce diene hydrocarbons. In a further aspect of this invention, 1,9-decadiene and 1,5-hexadiene are prepared from butadiene, ethylene, and hydrogen using dimerization, hydrogenation, and olefin disproportionation steps.

Description of the prior art

The art has recently reported numerous catalytic materials which effect the olefin disproportionation reaction of unsaturated hydrocarbons. The olefin reaction can be visualized as the breaking of two existing double bonds between first and second carbon atoms, and between third and fourth carbon atoms, respectively, and the formation of two new double bonds, such as between the first and third carbon atoms and the second and fourth carbon atoms, respectively, wherein the new double bonds can be on the same or different molecules. The reaction can be visualized by using a mechanistic scheme involving a cyclobutane transition state wherein two pairs of carbon atoms each pair connected by a double bond combine to form a 4-center intermediate which then disassociates by breaking either set of opposing bonds. This reaction can be illustrated by the following formulas:

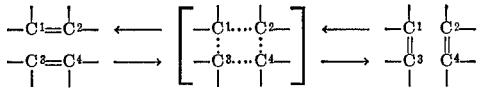

The above reaction has been described by various terms other than "olefin disproportionation." Among those terms utilized are "the olefin reaction," "olefin dismutation," "mutual cleavage," "transalkylidenation," and "olefin metathesis." Throughout this specification and claims, the term "olefin disproportionation" is used as a matter of choice and is deemed to be equivalent to the above-mentioned terms. In addition, it has recently been discovered that the disproportionation reaction can be applied to materials other than olefinically unsaturated hydrocarbons. Accordingly, it has been reported that acetylenically unsaturated hydrocarbons and olefinic materials which contain functional groups such as nitrile groups or fluoro groups also undergo this type of reaction.

Among the numerous catalyst systems which have been reported to effect the disproportionation reaction are those of U.S. Pat. 3,261,879, Banks (1966), and U.S. Pat. 3,365,513, Heckelsberg (1968). The Heckelsberg patent discloses that tungsten oxide on silica is a suitable disproportionation catalyst.

The disproportionation reaction of an acyclic olefin and a cyclic polyene has been described in the prior art by Mango, U.S. Pat. 3,424,811 (1969). A problem in conducting the reactions described by Mango, wherein an acyclic olefin and a cyclic polyene are reacted to provide diene products, is that low initial conversion levels are often necessary in order to insure that the selectivity of the reaction to the primary products is very high. However, such a process is very expensive because it increases the size of subsequent separation units and recycle lines. An additional problem encountered with the hydrocarbon feedstocks utilizing the Mango process is that contaminants often associated with the feed have a deleterious effect on conversion levels, thereby reducing the activity to the olefin disproportionation catalyst. A solution to this latter problem has been suggested whereby a guard bed of activated magnesium oxide operated at low temperatures is used to purify the feed olefins prior to introduction into the olefin disproportionation catalyst zone. However, this solution has been only partially successful in that high conversions of the cyclic olefin material in the reaction zone have been difficult to obtain.

OBJECTS OF THE INVENTION

It is an object of this invention to improve the initial conversion levels and ultimate yields of the acyclic diene products when disproportionating a mixture of acyclic olefins and cyclic olefin materials. It is a further object of this invention to provide 1,5-hexadiene and 1,9-decadiene from butadiene, hydrogen, and ethylene. Other objects and advantages of the present invention will be apparent to those skilled in the art from a reading of the following summary of the invention, detailed description of the invention, examples, and claims.

SUMMARY OF THE INVENTION

The problems discussed above concerning the Mango process can be avoided by our discovery. Our process comprises disproportionating a mixture of acyclic olefins in an olefin disproportionation catalyst zone wherein the catalyst comprises consecutive beds of magnesium oxide and the olefin disproportionation catalyst. The use of magnesium oxide at the temperature of the olefin disproportionation reaction results in higher initial conversions than those obtainable without the presence of the magnesium oxide. Subsequent to separation of the reaction effluent, the heavy materials produced by the initial reaction are returned to the consecutive bed catalyst zone at a point between the two beds. Thus, the recycled heavy hydrocarbons are contacted only with the olefin disproportionation catalyst rather than the combination of the high temperature magnesium oxide bed over the solid olefin disproportionation catalyst bed.

In a further embodiment of our invention, we have provided a process whereby 1,5-hexadiene and 1,9-decadiene can be prepared by first dimerizing butadiene in the presence of a cyclodimerization catalyst to provide 1,5-cyclooctadiene and 1,5,9-cyclododecatriene products. The two products of this reaction are then separated, and the cyclooctadiene is passed to a hydrogenation zone wherein in the presence of hydrogen and a suitable hydrogenation catalyst the cyclooctadiene is converted to cyclooctene. The cyclooctene is then passed to an olefin disproportionation reaction zone in the presence of ethylene to provide 1,9-decadiene. The 1,5,9-cyclododecatriene from the separation unit is passed to a second olefin disproportionation zone wherein it is reacted with ethylene to provide 1,5-hexadiene.

In a further embodiment of our invention, the disproportionation reaction of ethylene and 1,5-cyclooctadiene and the disproportionation reaction of ethylene and 1,5,9-cyclododecatriene is conducted in a single olefin disproportionation zone to provide 1,5-hexadiene, and 1,9-decadiene.

In our combination processes as discussed above, it is preferred that the olefin disproportionation reaction of ethylene and acyclic olefin reactants be conducted in a manner as discussed above whereby consecutive bed arrangement of magnesium oxide and the solid disproportionation catalyst is employed and the heavy materials produced in this reaction are returned to the reactor(s) at a point between the two catalyst beds.

BRIEF DESCRIPTION OF THE DRAWING

The sole figure of the drawing presents a schematic flow diagram which illustrates the combination process of our invention wherein dimerization, hydrogenation, and olefin disproportionation steps are used to convert butadiene, hydrogen, and ethylene to 1,5-hexadiene, and 1,9-decadiene.

DETAILED DESCRIPTION OF THE INVENTION

The acyclic olefin and cyclic olefin reactant materials used in our process have been described by Mango. Accordingly, the disclosure of his patent, U.S. Pat. 3,424,811, of Jan. 28, 1969, at column 1, lines 64–72, and column 2, lines 1–50, are hereby incorporated by reference into this application.

The olefin disproportionation catalysts employed in our process are also known in the prior art. Any solid catalyst system which is capable of promoting or catalyzing the olefin disproportionation reaction of butene-2 and ethylene to propylene is suitable for use in our process. Preferably, the disproportionation catalyst is one of molybdenum, tungsten, or rhenium oxide deposited on a support of silica, alumina, silica-alumina, or aluminum phosphate. A molybdenum oxide-promoted catalyst is disclosed in the Banks patent mentioned supra. Tungsten oxide-promoted catalyst is discussed in the Heckelsberg patent mentioned supra. The rhenium oxide-promoted catalyst is disclosed in British Pat. 1,054,864, Turner et al. As reported in the prior art, these solid catalysts can also contain minor amounts of various treating agents, such as trialkylaluminum compounds, dialkylaluminum halides, mono- and polyvalent alcohols, and the like. It is also sometimes advantageous to treat the solid catalyst with suitable gases, such as CO, $H_2$, and the like.

Disproportionation catalysts employed as the second bed in the catalyst zone of our invention can also be treated with alkaline earth and alkali metal compounds as reported in the prior art. Preferably, the alkaline earth or alkali metal compound is a compound of sodium or potassium.

The magnesia suitable for use in the invention can be any suitably activated material known in the art. The material normally has a surface area of at least 1 m.$^2$/g. Magnesia can be naturally occurring, such as the mineral brucite, or can be synthetically prepared by suitable techniques. Minor amounts of other materials such as silica, alumina, and the like, can be present but the material is principally magnesium oxide. Depending upon the contacting technique used in the consecutive bed reaction zone, the activated magnesia can be in the form of pellets, extrudates, agglomerates, or even a fine powder. Before use in the process, the magnesium oxide is activated in a suitable manner such as by heating the flowing stream of oxygen-containing gas for about 1 to about 30 hours at 500 to 1500° F., preferably 600 to about 1000° F. After activation sometimes it is advisable to flush the catalyst with an inert gas to remove any absorbed oxygen or other gases from the magnesium oxide. The regeneration of the spent magnesium oxide catalyst is generally accomplished by a technique similar to the activation of this material.

The olefin disproportionation conversion of the mixtures of acyclic olefins and cyclic olefin materials is accomplished in a reaction zone containing first a bed of the magnesium oxide and second a bed of the solid olefin disproportionation catalyst. Suitable techniques are well known in the art for suspending catalytic entities in a suitable reactor.

The reaction temperature of the conversion is dependent upon the particular olefin disproportionation catalyst employed, and will be selected for the temperature at which the catalyst gives the greatest amount of initial conversion of the reactant mixture to the primary products of the reaction. Generally, these temperatures range from about 150° to 1200° F. In the process of the invention, pressures are not important but will be in the range of from 0 to 2000 p.s.i.g., and weight hourly space velocities (WHSV) of about 0.1 to about 1000 w./w./hr.

The olefin disproportionation conversion reaction of the acyclic and cyclic olefins will generally produce a significant amount of heavier olefin materials having a greater molecular weight than the primary product of the reaction of the acyclic olefin with the cyclic olefin. For example, the reaction of ethylene and cyclooctene to produce 1,9-decadiene will produce appreciable quantities of olefin materials having 10 or more carbon atoms. The effluent from the olefin reaction zone is then separated using conventional techniques to provide a stream of the heavier olefin products which is returned to the initial olefin reaction zone. Therein the heavy products are introduced into the reactor at a point between the consecutive beds of the magnesium oxide and olefin disproportionation catalyst. Using this aspect of our invention, it is possible to readily convert the heavier materials to additional primary product of the reaction. For example, in the case of the ethylene and cyclooctene reaction, the $C_{10}^+$ material will be significantly converted to 1,9-decadiene.

In that embodiment of our invention wherein the 1,9-decadiene and 1,5-hexadiene are produced using a combination of dimerization, hydrogenation, and disproportionation steps, the dimerization catalyst can be any catalyst known in the art for the cyclooligomerization of butadiene to provide 1,5-cyclooctadiene and 1,5,9-cyclododecatriene. For example, the catalysts disclosed in U.S. Pat. 3,250,817 (1966) can be used.

Hydrogenation catalysts employed in our process can be any catalysts known in the art to promote the selective hydrogenation of 1,5-cyclooctadiene to cyclooctene. For example, the catalysts of 3,493,625 (1970) are suitable for this step of the process.

The combination process embodiment of our invention can best be understood by reference to the figure of our drawing. The figure presents a schematic flow diagram of our process using separate olefin disproportionation reactors for the conversion of cyclooctene and the conversion of 1,5,9-cyclododecatriene. The process employs two disproportionation zones, 69 and 72, a dimerization zone 66, a hydrogenation zone 68 and three fractionation zones 67, 71 and 73. The disproportionation zone 72 uses a suitable catalytic reactor which contains a consecutive bed arrangement of magnesium oxide and a solid olefin disproportionation catalyst. Butadiene-1,3 enters in line 11 and is contacted with a suitable cyclodimerization catalyst in zone 66. The cyclodimerization reaction produces a stream containing 1,5-cyclooctadiene and 1,5,9-cyclododecatriene in line 12. If the catalyst in zone 66 is of the soluble or suspended type, it can be separated and recycled to zone 66 (separation and recycle means not shown). Disproportionation zone 69 comprises a suitable reactor containing a solid olefin disproportionation catalyst with no magnesium oxide.

The effluent in line 12 is passed to fractionation zone 67 wherein the 1,5-cyclooctadiene is removed overhead in line 13 and the 1,5,9-cyclododecatriene is removed as bottoms in line 14. Any unreacted butadiene can be recovered and returned to zone 66 if desired (recovery and return means not shown). The 1,5-cyclooctadiene is passed via line 13 into hydrogenation zone 68 along with $H_2$ gas in line 16. Zone 68 contains a catalyst which is capable of selectively coverting the cyclic diene to the cyclic monoene, cyclooctene. The conditions in the zone are maintained to minimize the formation of cyclic alkanes. The cyclooctene is removed from zone 68 via line 17 and passed into an olefin disproportionation zone 72. Ethylene is introduced into line 17 via lines 18 and 19. Recycle ethylene is present in line 19 from line 22.

Within zone 72 the ethylene cleavage of the cyclic monoolefin produces 1,9-decadiene. The 1,9-decadiene containing effluent stream 21 is passed to fractionation zone 73 wherein the ethylene is recovered and removed via line 22 to be returned to zone 72 via line 19. Heavier olefin hydrocarbons are removed via line 24 and returned to zone 72 at a point intermediate to the bed of magnesium oxide and the olefin disproportionation catalyst bed for further conversion therein. Product 1,9-decadiene is removed from the fractionation zone 73 via line 23 as a product of the process.

The bottoms stream 14 from fractionation zone 67 comprises 1,5,9-cyclododecatriene which is passed to a second olefin disproportionation zone 69. Ethylene enters zone 69 via lines 18 and 26. The ethylene cleavage of 1,5,9-cyclododecatriene produces 1,5-hexadiene in the line 27 effluent which is passed to fractionation zone 71. Therein ethylene is separated and removed via line 28 and returned to reactor 69 via line 28. Olefin hydrocarbons heavier than 1,5-hexadiene, including unconverted 1,5,9-cyclododecatriene are returned to zone 69 via line 31. The 1,5-hexadiene product is removed from line 29.

A further embodiment of our invention is similar to that depicted in the drawing. However, instead of using two separate disproportionation steps, the ethylene cleavage of cyclooctene and cyclododecatriene is accomplished in a single olefin disproportionation zone. The reaction occurs readily as long as sufficient ethylene is provided to the reaction zone to insure high conversions of the feed cyclic olefins. Moreover, in this embodiment of our invention, the 1,5,9-cyclododecatriene is not contacted with the magnesium oxide catalyst bed which is maintained at high temperature. Thus, where separate reactors in the same conversion zone are used, the cyclooctene feed is passed through the hot magnesium oxide and the disproportionation reactor while the 1,5,9-cyclododecatriene and the heavier recycle products are contacted only with the disproportionation catalyst. In a consecutive bed arrangement of the catalysts within a single reactor the same contacting order is aso used.

The acyclic olefin or the cyclic olefin, or both, can be pretreated by contact with a bed of activated magnesium oxide at mild temperatures prior to being introduced into the reaction zone. The purity of the cyclic olefin feed is an important factor in the process of our invention because it directly affects the efficiency and operability of the process. The olefin disproportionation reaction in general requires substantial absence of materials which cause difficulty as, for example, by poisoning of the catalyst. Some of these impurities such as oxygen and water are known; others are unknown. Activated magnesia is greatly superior to any other absorption agents in the purification of feed streams for the olefin disproportionation reaction. Thus the magnesia mentioned above and as described for use in combination with the olefin disproportionation catalysts can be employed at low temperatures for pretreatment of the olefin feed. As opposed to the temperature of the activated magnesia in the olefin disproportionation zones, it is necessary that the pretreatment temperature be under mild temperature conditions. Accordingly, the temperature of treatment may be as low as the freezing point of the feed material, and may be as high as the point where significant isomerization of the single olefins such as butenes and pentenes is observed. Frequently, ambient temperatures such as room temperatures are satisfactory for pretreatment.

Any conventional contacting device can be used for the pretreatment. For example, the olefin can be treated by passing through a fixed or fluidized bed of activated magnesia or contact can be made by suspending the magnesia by suitable agitation in a vessel containing the olefin to be treated. Contact with the magnesia can be either in vapor or liquid phase. Time of contact, throughput rate in regard to the fixed bed of magnesia, or magnesia usage per unit weight of olefin can be varied over a wide range. However, a sufficient degree of treatment is allowed to bring the 1,5-cyclooctadiene and 1,5,9-cyclododecatriene into condition for reaction. Generally, pretreatment temperatures of from room temperature to about 150 F. are satisfactory.

If desirable, magnesium oxide can be used in conjunction with other known absorptive materials in the pretreatment step. For example, magnesium oxide can be used either consecutively or in a mixture with alumina, silica gel, molecular sieve type materials, absorptive clays, and the like. When used in mixture, the regeneration procedure should be selected to be compatible with all components of the treated mixture.

Our invention can be further illustrated by the following examples. The examples are presented to illustrate the invention as described hereinabove, and should not be construed as limiting that which has been described heretofore.

EXAMPLE I

Cyclooctene and ethylene were converted to 1,9-decadiene over a tungsten oxide on silica olefin disproportionation catalyst (6.8% $WO_3 \cdot 93.2\%$ $SiO_2$). The cyclooctene feed was purified by passage over a column of MgO and a mol sieve prior to being introduced to the reactor. Conditions of the runs and results are summarized below in Table I.

TABLE I

| Conditions: | | | | |
|---|---|---|---|---|
| Temperature, °F | 650 | | 650 | |
| P.s.i.g | 600 | | 600 | |
| $C_2H_4$/cyclooctene [a] | 10/1 | | 10/1 | |
| WHSV [b] | 50.8 | 81.7 | 100 | |
| Sample time, hrs | 0.75 | 1.33 | 0.5 | 2.35 |
| Results: | | | | |
| Percent conversion [c] | 83.3 | 78.0 | 73.9 | 77.5 |
| Ultimate yield of 1,9-decadiene, mol percent | 80.1 | 82.6 | 81.4 | 82.4 |
| Wt. percent heavies [d] | 12.2 | 12.8 | 12.8 | 12.1 |
| Product composition (wt. percent): [e] | | | | |
| Propylene | 0.33 | 0.29 | 0.13 | 0.13 |
| Butenes | 0.46 | 0.18 | 0.07 | 0.09 |
| Unkown A | 0.23 | 0.15 | 0.07 | 0.07 |
| Unknown B | 0.30 | 0.18 | 0.09 | 0.05 |
| Cyclohexene [f] | 1.12 | 0.62 | 0.33 | 0.34 |
| Cycloheptene [f] | 2.61 | 1.61 | 1.10 | 0.84 |
| 1,7-octadiene [f] | 5.08 | 3.51 | 3.44 | 2.77 |
| 1,9-decadiene | 80.27 | 83.21 | 84.51 | 85.68 |
| Heavier ($C_{10}^+$) | 9.74 | 10.25 | 10.61 | 10.03 |

[a] Mol ratio.
[b] Weight hourly space velocity.
[c] Conversion and ultimate yield were calculated on a cyclooctene feed purity of 94.26%.
[d] Expressed as weight percent of the cyclooctene converted.
[e] Product composition was calculated on an ethylene and cyclooctene free basis.
[f] The component was tentatively identified by GLC-mass spectroscopic analysis.

EXAMPLE II

In this example, 1,9-decadiene was prepared from cyclooctene and ethylene. A reactor was partially filled with 1.20 g. tungsten oxide on silica (6.8% $WO_3 \cdot 93.2\%$ silica). On top of this catalyst was placed a layer of asbestos fiber. On top of the fibers was placed a bed of 10.0 g. MgO.

The catalyst system was activated in place by passing air through the bed for about 3 hours at 1000° F., followed by treatment with CO for 15 minutes at the same temperature. The feed cyclooctene was passed over a column of MgO and a mol sieve to purify the feed prior to the reaction. The conditions of treatment and results are summarized in Table II below.

TABLE II

| Conditions: | | | |
|---|---|---|---|
| Temperature, °F | | 650 | |
| P.s.i.g | | 600 | |
| WHSV [a] | | 101 | |
| $C_2H_4$/cyclooctene [b] | | 9.2/1 | |
| Results: | | | |
| Sample time, hrs | 1.5 | 6.5 | 10.5 |
| Conversion, percent [c] | 92.6 | 90.8 | 87.8 |
| Ultimate yield of 1,9-decadiene, mol percent | 69.6 | 74.2 | 78.4 |
| Wt. percent heavies [d] | 11.5 | 11.7 | 11.1 |
| Product composition (wt. percent): [e] | | | |
| Propylene | 0.54 | 0.36 | 0.30 |
| Butenes | 0.24 | 0.13 | 0.09 |
| Unknown A | 0.06 | 0.08 | 0.03 |
| Unkown B | 0.13 | 0.14 | 0.07 |
| 1,5-hexadiene [f] | 0.21 | 0.14 | 0.07 |
| Cyclohexene [f] | 2.18 | 1.23 | 1.15 |
| Cycloheptene [f] | 5.49 | 3.84 | 3.41 |
| 1,7-octadiene [f] | 9.11 | 7.09 | 6.41 |
| 1,9-decadiene | 72.48 | 77.48 | 79.60 |
| Heavies ($C_{10}^+$) | 9.54 | 9.69 | 8.98 |

[a] Weight hourly space velocity based on tungstate catalyst alone.
[b] Mole ratio.
[c] Conversions and ultimate yields were calculated on feed purity of 94.26% as cyclooctene.
[d] Expressed as weight percent of the cyclooctene converted.
[e] Caluculated on an ethylene and cyclooctene free basis.
[f] The component was tentatively identified by GLC-mass spectroscopic analysis only.

It is readily apparent from the comparison of the results of Examples I and II that the addition of a bed of magnesium oxide over the tungstate disproportionation catalyst in the conversion reactor provides increased conversions of the cyclooctene feed.

EXAMPLE III

A second run was made using an essentially identical catalyst and feed as employed in Example II. In this run, the ethylene to cyclooctene mol ratio was varied. Conditions and results are summarized below in Table III.

TABLE III

| Conditions: | | | |
|---|---|---|---|
| Temperature, °F | | 650 | |
| P.s.i.g | | 600 | |
| WHSV | | 106 | |
| $C_2H_4$/cyclo $C_8$ | 4/1 | 8/1 | 12.6/1 |
| Sample time, hrs | 0.5 | 1.5 | 2.5 |
| Results: | | | |
| Percent conversion | 94.7 | 90.2 | 86.2 |
| Ultimate yield of 1,9-decadiene | 58.1 | 71.7 | 87.0 |
| Wt. percent heavies | 24.2 | 13.8 | 9.8 |
| Product composition (wt. percent): | | | |
| Propylene | 0.90 | 0.31 | 0.21 |
| Butenes | 0.41 | 0.14 | Nil |
| Unknown A | 0.19 | 0.09 | Nil |
| Unknown B | 0.16 | 0.10 | Nil |
| 1,5-hexadiene | 0.33 | 0.10 | Nil |
| Cyclohexene | 2.42 | 0.99 | 0.59 |
| Cycloheptene | 5.37 | 3.11 | 1.83 |
| 1,7-octadiene | 7.29 | 4.83 | 3.99 |
| 1,9-decadiene | 62.20 | 78.29 | 86.40 |
| Heavies ($C_{10}^+$) | 20.66 | 12.04 | 7.00 |

The above data demonstrate that at ethylene to cyclooctene mol ratios of 8/1 and 12.6/1 as compared to 4/1, higher ultimate yields are obtained with concurrent reduction in the amounts of heavy materials produced.

EXAMPLE IV

Two runs were made to demonstrate the conversion of the $C_{10}^+$ heavy material prepared in Example II above.

Mass spectrographic analysis of the heavies showed the principal component of the $C_{10}^+$ heavy material was a noncyclic $C_{17}H_{30}$ olefin (5.99 wt. percent) and a noncyclic $C_{18}H_{32}$ olefin (84.59 wt. percent). The $C_{18}H_{32}$ olefin was believed to be 1,9,17-octadecatriene.

The heavy fraction of the run of Example II was flashed overhead to remove any oxygenated product. Since a limited amount of the flashed overhead was available, it was diluted with cyclohexane. The mixed feed was stored under nitrogen and repercolated over magnesium oxide-mol sieve prior to being introduced into the reactor.

In this example, one reactor was filled with the same catalyst as used in Example I. The other reactor was filled with the catalyst used in Example II. Conditions and results are summarized below in Table IV.

TABLE IV

| | Run | |
|---|---|---|
| | A | B |
| Catalyst | MgO—$WO_3$/$SiO_2$ | $WO_3$/$SiO_2$ |
| Conditions: | | |
| Feed, wt. percent: | | |
| Cyclohexane | 51.71 | 72.10 |
| 1,9-decadiene | 0.85 | 0.77 |
| $C_{10}^+$ | 41.35 | 26.89 |
| Temperature, °F | 650 | 650 |
| P.s.i.g | 600 | 600 |
| $C_2H_4$/$C_{10}^+$ feed [a] | 3.12 | 3.42 |
| WHSV [b] | 20 | 54 |
| Results: | | |
| Percent conversion of $C_{10}^+$ | 37.5 | 59.0 |
| 1,9-decadiene yield, wt. percent: [c] | | |
| On $C_{10}^+$ feed | 1.0 | 28.7 |
| On $C_{10}^+$ consumed | 2.6 | 48.7 |
| Product composition, wt. percent: [d] | | |
| Propylene | 2.62 | 13.34 |
| Butenes | 10.16 | 1.51 |
| Unknown A | 17.70 | 0.33 |
| Unknown B | 29.18 | 1.34 |
| Unknown C | 15.74 | Nil |
| 1,7-octadiene [e] | 12.46 | 9.03 |
| 1,9-decadiene | 12.13 | 74.25 |

[a] Weight ratio based on the $C_{10}^+$ content of the feed.
[b] Weight hourly space velocity of the $C_{10}^+$ feed over the tungstate catalyst only.
[c] Net yield, corrected for small amounts of 1,9-decadiene in the feed.
[d] Calculated on an ethylene and $C_{10}^+$ heavies free basis.
[e] Component was tentatively identified by GLC analysis only.

The above example demonstrates that in an operation in which the heavy $C_{10}^+$ material is returned to the process as a recycle stream, the yield of additional 1,9-decadiene is several fold larger when said stream is passed over only the $WO_3 \cdot SiO_2$ catalyst as compared to the yield obtained by passing this stream over both the MgO and $WO_3 \cdot SiO_2$ catalysts.

EXAMPLE V 1,5-hexadiene was prepared by the conversion of 1,5,9-cyclododecatriene and ethylene over an olefin disproportionation catalyst of tungsten oxide on silica. The 1,5,9-cyclododecatriene feed was purified over a mol sieve prior to introduction into the reactor. Reaction conditions and results are set forth below in Table V.

TABLE V

| Sample number | 1 | 2 | 3 | 4 | 5 | 6 | 7 | 8 |
|---|---|---|---|---|---|---|---|---|
| Conditions: | | | | | | | | |
| Temperature, °F | 600 | 600 | 680 | 650 | 675 | 700 | 700 | 700 |
| P.s.i.g | 400 | 400 | 400 | 400 | 400 | 400 | 400 | 400 |
| $C_2H_4$/1,5,9-cyclododecatriene (CDT) weight ratio | 14/1 | 14/1 | 14/1 | 14/1 | 14/1 | 14/1 | 14/1 | 28/1 |
| WHSV | 10 | 10 | 15 | 10 | 10 | 10 | 20 | 10 |
| Results: | | | | | | | | |
| Percent conversion (CDT) | 98.6 | 99.3 | 99.6 | 99.9 | 99.8 | 99.9 | 99.9 | 99.7 |
| Product composition (wt. percent): | | | | | | | | |
| 1,9-decadiene | 6.7 | 7.3 | 8.7 | 6.9 | 6.2 | 4.2 | 10.3 | 5.5 |
| 1,5-hexadiene | 85.1 | 87.8 | 85.2 | 85.9 | 87.3 | 89.0 | 81.6 | 88.0 |

This example demonstrates that 1,5,9-cyclododecatriene and ethylene can be converted to 1,5-hexadiene in the presence of an olefin disproportionation catalyst.

Reasonable variations and modifications of the invention as described above will be apparent to those skilled in the art without departing from the spirit and scope thereof. Thus the description herein of a consecutive bed arrangement of the two catalyst entities in a single reaction zone is obviously equivalent to, and is intended to be synonymous with, an arrangement of two separate catalytic reactors where the isomerization catalyst reactor is operated at isomerization conditions followed by the disproportionation reactor.

That which is claimed is:

1. In a process of converting a mixture of ethylene and cyclooctene by means of the olefin disproportionation reaction to provide 1,9-decadiene, the improvement comprising the steps of
   (a) contacting the mixture of ethylene and cyclooctene in a single reaction zone with a first catalyst which is magnesium oxide and a second catalyst which is an olefin disproportionation catalyst to provide an effluent stream comprising the 1,9-decadiene and heavier olefins of greater molecular weight than 1,9-decadiene;
   (b) separating the effluent stream of Step (a) to provide a 1,9-decadiene stream as product of the process and a stream comprising the heavier olefins;
   (c) returning the stream comprising the heavier olefins to the reaction zone of Step (a) at a point between the two catalysts thereby converting the heavier olefins to produce additional 1,9-decadiene.

2. The process of claim 1 wherein the cyclooctene or the ethylene, or both, is pretreated by contact with a bed of activated magnesium oxide at mild temperature prior to being introduced into the reaction zone of Step (a).

3. The process of claim 1 wherein the olefin disproportionation catalyst is one of molybdenum oxide, tungsten oxide, and rhenium oxide on a support of silica, alumina, silica-alumina, or aluminum phosphate.

References Cited

UNITED STATES PATENTS

| | | | |
|---|---|---|---|
| 3,658,929 | 4/1972 | Banks | 260—683 |
| 3,424,811 | 1/1969 | Mango | 260—680 |
| 3,527,828 | 9/1970 | Mango | 260—677 |
| 3,530,196 | 9/1970 | Singleton | 260—680 |
| 3,549,722 | 12/1970 | Pennella | 260—683 |

PAUL M. COUGHLAN, JR., Primary Examiner